(12) United States Patent
Holzhüter et al.

(10) Patent No.: US 11,796,649 B2
(45) Date of Patent: Oct. 24, 2023

(54) METHOD AND DEVICE FOR OPTICALLY MEASURING DISTANCES

(71) Applicant: Microvision, Inc., Redmond, WA (US)

(72) Inventors: Hanno Holzhüter, Hamburg (DE);
Frederik Lange, Regensburg (DE);
Christian Fellenberg, Hamburg (DE)

(73) Assignee: Microvision, Inc., Redmond, WA (US)

( * ) Notice: Subject to any disclaimer, the term of this patent is extended or adjusted under 35 U.S.C. 154(b) by 461 days.

(21) Appl. No.: 17/081,223

(22) Filed: Oct. 27, 2020

(65) Prior Publication Data
US 2021/0124027 A1 Apr. 29, 2021

(51) Int. Cl.
G01S 7/4865 (2020.01)
G01S 17/931 (2020.01)
G01S 17/10 (2020.01)

(52) U.S. Cl.
CPC ............ G01S 7/4865 (2013.01); G01S 17/10 (2013.01); G01S 17/931 (2020.01)

(58) Field of Classification Search
CPC ....... G01S 7/4865; G01S 17/931; G01S 17/10
See application file for complete search history.

(56) References Cited

U.S. PATENT DOCUMENTS

| 9,268,013 | B2 * | 2/2016 | Rieger | G01S 17/18 |
| 10,466,342 | B1 * | 11/2019 | Zhu | G01S 17/10 |
| 2013/0148101 | A1 * | 6/2013 | Yoo | G01S 13/931 |
| | | | | 356/5.01 |
| 2017/0329010 | A1 * | 11/2017 | Warke | G01S 17/10 |
| 2018/0203122 | A1 * | 7/2018 | Grauer | G01S 17/89 |
| 2018/0259645 | A1 * | 9/2018 | Shu | H01L 31/107 |

FOREIGN PATENT DOCUMENTS

| DE | 10 2016 011 299 A1 | 3/2018 |
| DE | 10 2017 208 704 A1 | 11/2018 |
| DE | 102017208704 | 11/2018 |
| WO | 2012/135874 A1 | 10/2012 |

OTHER PUBLICATIONS

European Search Report issued for corresponding European Patent Application No. EP 19205601, dated Apr. 27, 2020, 2 pages, Munich, Germany.

* cited by examiner

*Primary Examiner* — Isam A Alsomiri
*Assistant Examiner* — Joseph C Fritchman
(74) *Attorney, Agent, or Firm* — Kevin D. Wills (57) ABSTRACT

What is proposed is a method for optically measuring distances, in the case of which a first plurality of measuring pulses is emitted during a first measuring interval by means of a transmitting element of a transmitting unit at first emitting times, and wherein a second plurality of measuring pulses is emitted during a second measuring interval by means of the transmitting element of the transmitting unit at second emitting times. The method comprises the reception of reflected measuring pulses by means of a receiving element of a receiving unit assigned to the transmitting element at receiving times. The method further comprises the determining of a first amount of times-of-flight for each received measuring pulse, wherein the first amount of times-of-flight is determined by using the first emitting times.

20 Claims, 5 Drawing Sheets

METHOD AND DEVICE FOR OPTICALLY MEASURING DISTANCES

CROSS REFERENCE TO RELATED APPLICATION

This application claims the benefit of European Patent Application No. 19205601.8, filed on Oct. 28, 2019. The contents of the European Patent Application No. 19205601.8 are hereby incorporated by reference for all purposes.

FIELD OF THE INVENTION

This disclosure relates to a method as well as to a device for optically measuring distances.

BACKGROUND

Optical distance measurements, in particular for use in the driverless navigation of vehicles, are known from the prior art. They are based on the time-of-flight (ToF) principle, whereby a scanning sensor, in particular a LIDAR (abbreviation for "light detection and ranging") is used, which periodically emits measuring pulses, which are reflected on objects, wherein the reflected measuring pulses are detected. From the determination of the time-of-flight of the measuring pulses from the sensor to the objects and back, a conclusion can be drawn to the distance to these objects with the help of the speed of light.

The principle of the ToF-measurements is limited in that measuring pulses have to be emitted with a certain distance from one another, in order to avoid so-called aliasing effects.

Generally, in the case of ToF measurements, twice the time-of-flight has to be awaited until the end of a measuring region, until a previously emitted measuring pulse has theoretically been received again after reflection. If this time is not awaited, a clear assignment of the received measuring pulses is not possible, because the emitting time is uncertain. This limits the possibility of ToF measurements because the time-of flight of the pulse, i.e. the time the measuring pulse needs until it reaches a sensor again, cannot be accelerated. So, in order to scan a large distance region, after the initiation of a measuring pulse, twice the time-of-flight to the possible object, which is farthest away, has to be awaited until a measuring pulse can be output again.

For the maximum detection range, the output energy is further an essential parameter in order to ensure that reflections of distant objects can still be detected.

As a whole, the increase of a likelihood of detection is generally only possible in the prior art by means of an increased time budget or increased energy, respectively. As part of the eye safety, however, a smallest possible peak power of the sent pulses is desirable thereby. A small time budget is also worthwhile, because only then are measuring results are present in a timely manner and can be used for time-critical applications, such as, for example, driving assistance.

DE 10 2016 011 299 A1 describes, for example, the use of encoded pulse sequences in order to avoid above-described ambiguities. However, the detection range also suffers in the case of pulse sequences, because measuring pulses are not detected and a recognition of the sequence is not possible in particular in the case of long distances.

SUMMARY

The present solution is based on the object of improving a method as well as a device for measuring distances in such a way that the maximum detection range can be increased without changing the time budget, the peak power of measuring pulses can be decreased without changing the likelihood of detection, and an interference by means of internal or external pulses can be avoided.

The above-mentioned object is solved by means of a method for optically measuring distances, in the case of which a first plurality of measuring pulses is emitted during a first measuring interval by means of a transmitting element of a transmitting unit at first emitting times, and a second plurality of measuring pulses is emitted during a second measuring interval by means of a transmitting element of a transmitting unit at second emitting times. Reflected measuring pulses are received at receiving times by means of a receiving element of a receiving unit, which is assigned to the transmitting element.

The method comprises the determining of a first amount of times-of-flight for each received measuring pulse. The times-of-flight are thereby determined by using the first emitting times. The times determined in this way form the times-of-flight of the first amount. For this purpose, each first emitting time is preferably deducted from the receiving time of each received measuring pulse.

A second amount of times-of-flight is determined in the same way. In detail, the method comprises the determining of a second amount of times-of-flight for each received measuring pulse by using the second emitting times, namely preferably in that each second emitting time is deducted from the receiving time of the respective received measuring pulse.

The emitting times are preferably in each case determined in relation to the start time of the respective measuring interval. The receiving times are preferably determined in relation to the start time of the first measuring interval.

All combinations of receiving times are thus preferably considered at emitting times. Emitting times are thus also deducted from receiving times, which are later in time than said receiving times. This is the case, for example, when the receiving time (in relation to the start time of the first measuring interval) is larger than the emitting time (in relation to the start time of the second measuring interval), even though the emitting time is later than the receiving time. The correct time-of-flight can nonetheless be determined easily and effectively. Difficult and complex comparisons of emitted and received sequences of pulses can thus be forgone.

The method further comprises the creating of at least one histogram for the receiving element, and the entering of the first amount and/or of the second amount of times-of-flight in the histogram. In other words, at least one, in particular exactly one, histogram, can be created for each measuring interval. Measuring intervals can further be entered in a common histogram. Individually created histograms can further be added to form a common histogram.

The present method is carried out in particular by means of a transmitting unit, comprising a plurality of transmitting elements and a receiving unit, comprising a plurality of receiving elements. Each transmitting element of the transmitting unit is in particular assigned to a defined subregion of the measuring region, in other words to a room element of the measuring region. The same applies for the receiving unit. A subregion of the measuring region is likewise assigned to each receiving element. This results in an unambiguous assignment between transmitting elements of the transmitting unit and receiving elements of the receiving unit. From the fact which receiving element thus receives a measuring pulse, a conclusion can be drawn about the position of the reflecting object, on which the measuring pulse was reflected.

A reflected measuring pulse is a measuring pulse, which had been emitted previously, so that its direction of propagation has changed due to the reflection on an object. The reflected measuring pulse can thus be understood as echo of the emitted measuring pulse. The time-of-flight of the measuring pulses to the objects on which they were reflected is determined in particular by means of the method, and the distance to the object covered by the respective measuring pulse is determined from said time-of-flight with the help of the speed of light.

An optical measuring of distances is characterized in that distances are determined by using optical signals, here optical measuring pulses. The term "distance" is to be understood as a range. The distance covered by the measuring pulse is to be understood as the route between the transmitting element which has emitted the measuring pulse and the object which has reflected said measuring pulse, plus the route between the object and the receiving element, which has received the corresponding reflected measuring pulse. The method comprises in particular the consideration of the exact position of the transmitting element and of the receiving element, in particular in relation to one another. Due to the fact that the at least one object is typically a three-dimensional object, so that some regions of the object can be arranged closer, and other regions of the object can be arranged further away, the term "distance to the object" refers to the range to at least one point of the object, namely the point which the measuring pulse has struck and on which said measuring has been reflected. Time-of-flight is to be understood to be the time which the measuring pulse required for the above-described distance.

The method preferably serves for measuring the distance for use in the driverless navigation or driving assistance of vehicles.

A measuring pulse is in particular an electromagnetic, in particular an optical signal. This signal preferably has a wavelength, which does not originate from the region visible for the human eye. For safety reasons, invisible infrared is preferably used. Due to the fact that the measuring pulse is an electromagnetic signal, and the speed of the measuring pulse is thus known, a conclusion as to which route the measuring pulse has covered can be drawn from the time-of-flight of a measuring pulse with the help of the speed of light.

When determining first amounts of times-of-flight, the received measuring pulses are evaluated in a very specific way. In that the receiving times are correlated with all possible emitting times, a multiple compensation takes place, whereby a compensation is to be understood as a shift of the receiving time of a received measuring pulse in the histogram on the basis of an emitting time. In other words, each measuring pulse is compensated by each plausible or possible emitting time, respectively, whereby all results are entered in a histogram.

In this way, exactly one "correct entry" results for each measuring pulse, because the receiving time was compensated with the correct emitting time. However, a plurality of "incorrect entries" results as well, because the receiving time of a measuring pulse was compensated with "incorrect emitting times", i.e. emitting times of other measuring pulses. Due to the fact, however, that a plurality of measuring pulses was emitted within a measuring region, it is not known, which of these emitting times is correct. This is solved by means of the present method. It increases the entries in the histogram, whereby the entries of the "correct compensations" overlap only at one position. All further times-of-flight, which result due to compensation with "incorrect emitting times", additionally appear as interference in the histogram symmetrically around this correct position. The first and second amount of times-of-flight for one measuring pulse thus comprise all possible times-of-flight, whereby only one of them is "correct", because the correct emitting time formed the basis for the determination.

The correct distance to an object on which the measuring pulses were reflected can thus be determined. The method comprises in particular the determination of a distance on the basis of the histogram, which can be assigned in particular to the receiving element. This takes place in particular by means of determination of the time-of-flight at which most entries are present. This corresponds in particular to the "correct" time-of-flight, from which the distance can be determined easily by considering the speed of light.

Due to the fact that a plurality of measuring pulses is emitted, but corresponding ambiguities can be solved unambiguously, the maximum detection range can be increased without changing the time budget and/or the peak power of the measuring pulses is reduced while likewise not changing the likelihood of detection. In particular, the increase of the measuring pulses per time unit increases the likelihood of detection and the signal-to-noise ratio. The present invention is thus able to solve the limitation of the time budget (based, for example, on the requirement on the image sequence for detecting a scene with movement) and the limitation of the energy (based on the eye safety).

The plurality of the measuring pulses emitted within a measuring interval can also be understood as pulse sequence. The term refers in particular to a time sequence of measuring pulses, which is determined by the number of the measuring pulses, the pulse lengths thereof, and in chronological pulse distances between the measuring pulses. In the present method, however, a single time-of-flight is not assigned to the entire pulse sequence, as it is known from the prior art, even if the measuring pulses can be understood as pulse sequence. Instead, each measuring pulse is evaluated individually, and one correct and a plurality of "incorrect times-of-flight" is assigned to the measuring pulse.

The first measuring interval and the second measuring interval are in particular not identical. They preferably each have a start time and an end time, whereby the start times and/or the end times preferably do not coincide.

The first and/or the second measuring interval preferably have a length, wherein the length is adapted to the single length or to the double length of the measuring region. The measuring intervals thus in particular have the same length, wherein the length of the measuring interval is selected in such a way that it corresponds to the time, which a measuring pulse needs to completely pass through the measuring region once (i.e. to the end of the measuring region) or twice (i.e. to the end of the measuring region and back again).

The length of the measuring interval thus corresponds to an emission window, in which measuring pulses are emitted. The detection interval, in which measuring pulses can be received, can start simultaneously with the corresponding, preferably the first, measuring interval.

The length of the detection interval can further correspond to twice or four times the length of the measuring interval. The method comprises in particular the memorization of the emitting times of the measuring intervals, so that receiving times can be correlated with them.

A detection interval can be assigned to each measuring interval. The detection region then overlaps in particular with the following, in particular second, measuring interval or encompasses it completely.

A common detection interval can further be assigned to several measuring intervals, in particular to the first and the second measuring interval. The detection interval then begins with the start time of the first measuring interval and preferably ends after the period of a further measuring interval has also gone by after the end time of the second or last measuring interval.

The first and the second measuring interval can overlap thereby. The start point of the second measuring interval is thus earlier than the end time of the first measuring interval. The first measuring interval and the second measuring interval in particular follow one another directly.

The first measuring interval and the second measuring interval can further be spaced apart from one another in time, can thus not follow one another directly. The start point of the second measuring interval is thus later than the end time of the first measuring interval, whereby the detection interval and the second measuring interval nonetheless at least overlap. In particular, the detection region always comprises the second measuring interval. This means that even though measuring pulses of a measuring interval are still traveling and can still be detected due to the detection interval, which is preferably twice as long, a new measuring interval can already follow with the emission of new measuring pulses. The pulse sequences of adjacent measuring pulses are thus simultaneously "on air".

The method preferably comprises conducting further measurements in further measuring intervals, wherein adjacent measuring intervals follow one another directly in time.

The histogram in particular comprises the length of the measuring intervals. In particular, only times-of-flight which are larger than 0 and smaller than the length of the measuring interval are entered in the histogram.

An identical number of measuring pulses can in particular be emitted in the measuring intervals, for example a number N. Due to the fact that the measuring pulses emitted during this measuring interval as well as the measuring pulses emitted during the previous measuring interval can be received during a measuring interval, 0 to 2 N measuring pulses can thus be received, wherein N is the number of the emitted measuring pulses per time interval.

Adjacent measuring pulses of the plurality of measuring pulses emitted during a measuring interval can further preferably have a random distance from one another. In particular, the emitting times of the measuring pulses of the first measuring interval and of the second measuring interval or of adjacent measuring intervals can differ. Due to the randomness of the positions of individual measuring pulses during a sequence, the evaluation and thus the determination of the distance is thus robust during the sequences with regard to interferences of own adjacent sequences as well as with regard to interferences from the outside, because they are distributed over the histogram.

Due to the random emitting times, the incorrect entries in the histogram are also distributed randomly, so that the correct entries, which overlap, stand out clearly.

Further preferably, the plurality of measuring pulses emitted during the first or second measuring interval can be encoded. At least two measuring pulses emitted in the first measuring interval or in the second measuring interval thereby differ, in particular by their pulse shape. Each measuring pulse can in particular differ from any other measuring pulse, but only two different encoding states can be possible as well. Measuring pulses can further differ by their pulse length. An encoding state can thus be understood as a pulse shape and/or a pulse length.

Based on the states, one histogram per encoding state can be created, as described above. For this purpose, the method can comprise the memorization of the encoding states of the emitted measuring pulses and the determination of the encoding states of the received measuring pulses. The determination of a first amount of times-of-flight for each received measuring pulse only considers the emitting times of the measuring pulses with the same encoding state. The same applies to the second amount of times-of flight. An independent histogram, in which the times-of-flight of the correspondingly encoded received measuring pulses are entered, is then created for each encoding state. The entries in the respective histograms thus decrease because measuring pulses can already be differentiated on the basis of their encoding states.

The measuring region can preferably be divided into at least one short section, a mid-section, and a far section. The short section is the spatially next section, preferably directly adjacent to a device for carrying out the method, while the far section represents the rearmost section, in other words a section at the end of the measuring region. The mid-section is located therebetween. The first third of the measuring region can, for example, represent the short section, the middle third can represent the mid-section, and the last third can represent the far section. Each receiving element in particular has an imaging region, in particular a photosensitive area, wherein the latter can be divided into different regions, in particular depending on the section of the measuring region, in which the measuring pulse was reflected. Reflected measuring pulses from the short section, the mid-section, and the far section are thus received at different regions of a receiving element.

In other words, a shift of the imaging region is present, at which a pulse occurs on a receiving element, namely as a function of the range of the object, on which the measuring pulse was reflected. The shift results from a parallax error.

A short interval of the measuring interval and a short region of the receiving element can be assigned to the short section, a mid-interval of the measuring interval and a mid-region of the receiving element can be assigned to the mid-section, and a far interval of the measuring interval and a far region of the receiving element can be assigned to the far section. This corresponds to the temporal sections of the measuring interval, into which the corresponding times-of-flight fall in the sections of the measuring interval, which vary in ranges. The first third of the measuring interval can, for example, represent the short interval, the middle third can represent the mid-interval, and the last third can represent the far interval.

The different regions of the imaging region of the receiving element can be controlled separately. The short region of the receiving element can preferably be formed to be less sensitive than the mid-region and the far region of the receiving element. This serves the purpose of preventing a "dazzling" of the short region, for example because a highly reflective object is located in very close range.

The short region, the mid-region, and the far region of the receiving element can be controlled on the basis of the short interval, of the mid-interval, and of the far interval of the first measuring interval. The different regions of the receiving element are in particular activated if and only if the measurement is in the corresponding short interval, mid-interval, or far interval. In detail, the short region is activated during the short interval, the mid-region during the mid-interval, and the far region during the far interval. Elsewhere, the corresponding regions are deactivated.

The control in particular takes place only on the basis of the first measuring interval, wherein the emission of the measuring pulses of the second measuring interval does not have an impact on the activation of the regions. It can be advantageous, however, to deactivate all regions of the receiving element in the corresponding short interval of the second measuring interval, in order to avoid a dazzling.

The second measuring interval can in particular be followed by a third measuring interval, on the basis of which the regions are controlled. Each second measuring interval thus preferably controls the activation or deactivation, respectively, of the regions of the receiving element, while the measuring intervals located therebetween do not influence the control, except for the deactivation of all regions during the corresponding short interval.

By means of the method, the above-mentioned steps are in particular performed for several transmitting elements of a transmitting unit and corresponding receiving elements of a receiving unit, in particular all transmitting elements and receiving elements. In other words, several transmitting elements emit corresponding measuring pulses during a measuring interval at emitting times, and are in each case received by corresponding receiving elements at receiving times, wherein a first amount and a second amount of times-of-flight are then in each case determined for the measuring pulses received by each receiving element. A corresponding histogram is thereby in each case created for all receiving elements.

In a further aspect, the invention relates to a device for carrying out the above-described method. The device is thus formed to carry out a method according to the invention.

The device in particular comprises a transmitting unit and a receiving unit. The transmitting unit in particular comprises transmitting elements, and the receiving unit comprises receiving elements, in particular sensor pixels. The transmitting elements and receiving elements are preferably combined at a transmission matrix or a receiving matrix, respectively. A matrix can in particular be understood as three-dimensional, in particular plate-shaped, body, on the one surface of which the corresponding elements are arranged.

The device is in particular a scanning device, preferably a LIDAR sensor. In each case, the transmitting elements are preferably a laser, in particular VCSEL. The transmitting elements can further be laser diodes, fiber lasers, or LEDs. The transmitting elements can further comprise addressable liquid crystals. The transmitting unit can further be an optical phased array. The transmitting elements can be controlled individually.

The receiving elements are in particular linear or non-linear detectors, in particular in the form of an array, preferably a focal plane array, in particular an ADP array, most preferably a SPAD array. The array can further comprise quantum film structures based on quantum dots.

The receiving elements can be individually controlled or activated, respectively. Each receiving element in particular comprises different regions, in particular a short region for receiving measuring pulses from a short section of the measuring region, a mid-region for receiving measuring pulses from a mid-section of the measuring region, and a far region for receiving measuring pulses from a far section of the measuring region. The different regions can be individually controlled or activated, respectively, and evaluated.

Further preferably, the device comprises at least one evaluating unit, which is preferably formed to determine the first amount and second amount of times-of-flight, and to create a histogram. The evaluating unit can further be configured to read a distance from the histogram.

The device can further comprise a control unit, which is configured to control the transmitting unit, the receiving unit, and the evaluating unit.

The present invention further relates to a computer program product, which comprises a computer-readable storage device, on which a program is stored, which, after it was loaded into the memory of the computer, makes it possible for a computer to carry out an above-described method, optionally together with an above-described device. The invention furthermore relates to a computer-readable storage device, on which a program is stored, which, after it was loaded into the memory of the computer, makes it possible for a computer to carry out an above-described method, optionally together with an above-described device.

DETAILED DESCRIPTION OF THE PREFERRED EMBODIMENTS

Figure 1:
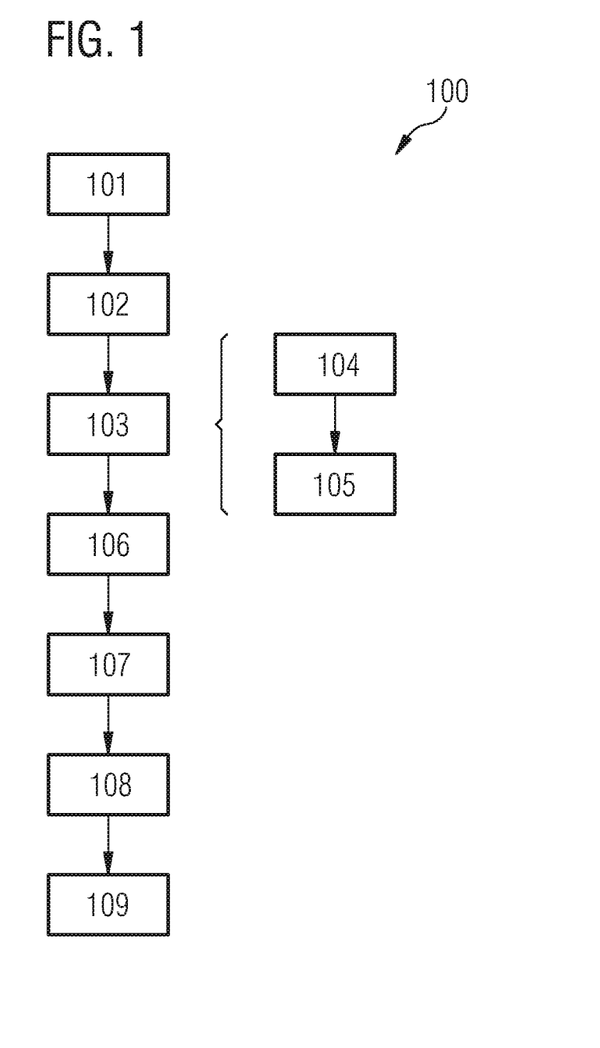
FIG. 1 shows a process diagram of a method according to the invention.

A process diagram of a method 100 according to the invention is illustrated in FIG. 1.

The method 100 comprises the emitting 101 of a first plurality of measuring pulses 13 during a first measuring interval 10 at first emitting times, and the emitting 101 of a second plurality of measuring pulses 13 during a second measuring interval 11 at second emitting times. The method 100 comprises the reception 103 of reflected measuring pulses by means of a receiving element of a receiving unit assigned to the transmitting element at receiving times.

Beforehand, a short region of the receiving element and a short interval of the corresponding measuring interval can thereby be assigned to a short section of the measuring region. A mid-interval of the measuring interval and a mid-region of the receiving element can further be assigned to a mid-section of the measuring region, and a far region of the receiving element and a far interval of the measuring interval can be assigned 104 to a far section of the measuring region. The short region, the mid-region, and the far region can be controlled 105 on the basis of the short interval, of the mid-interval, and of the far interval of the first measuring interval 10.

The method 100 comprises the determining 106 of a first amount of times-of-flight and the determining 107 of a second amount of times-of-flight for each received measuring pulse. The method 100 further comprises the creating 108 of a histogram for the receiving element, and the entering of the first amount and/or second amount of times-of-flight in the histogram 15. The method can further comprise the determining 109 of a distance from the histogram 15.

Figure 2:
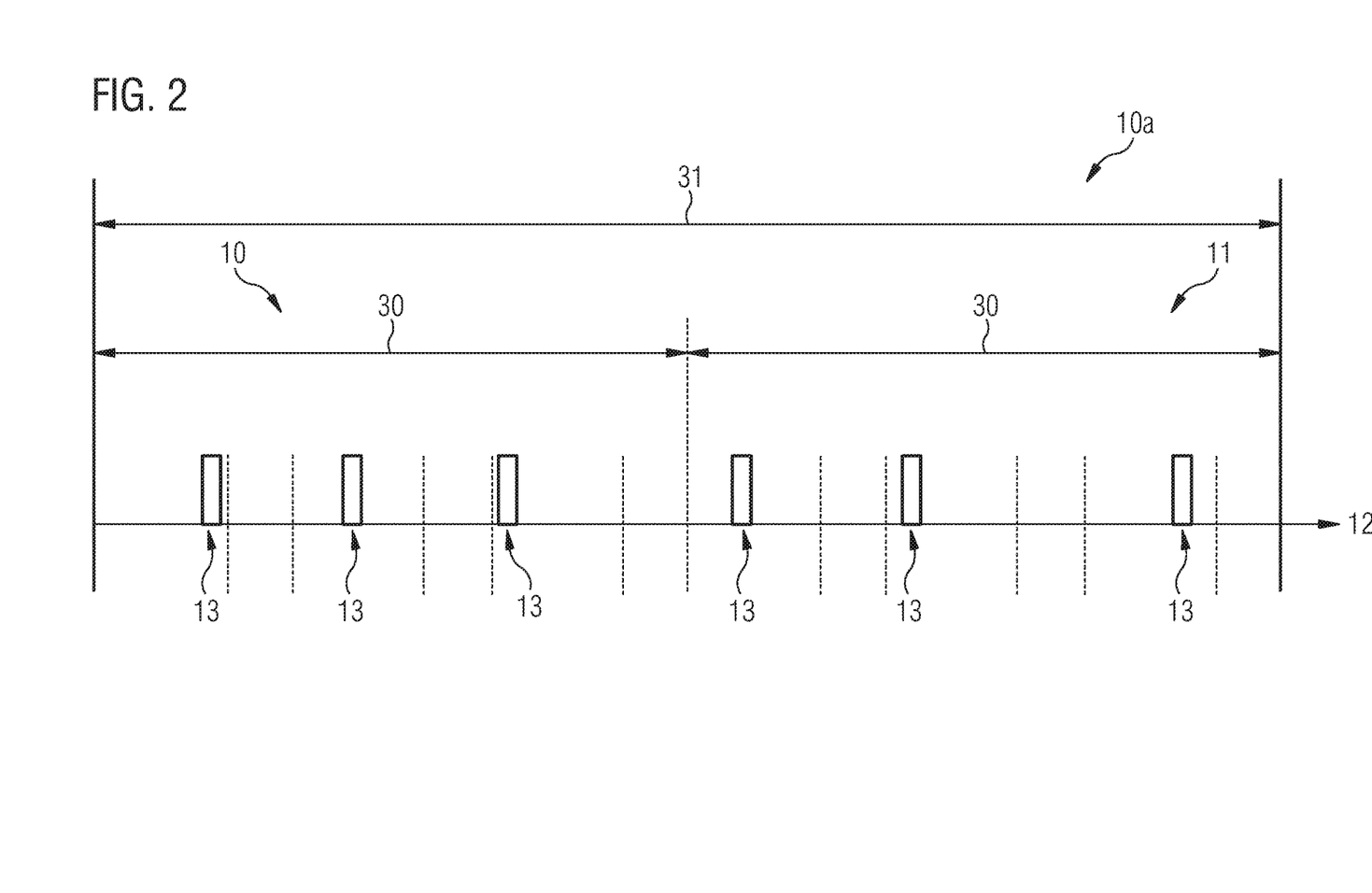
FIG. 2 shows two directly consecutive measuring intervals.

FIG. 2 shows, schematically, two directly consecutive measuring intervals, a first measuring interval 10 and a second measuring interval 11, which are plotted with respect to the time 12. The detection interval 10a is also shown, which starts simultaneously with the first measuring interval 10, but which is twice as long and thus also extends over the second measuring interval 11. The detection interval 10a can be assigned to the first measuring interval 10 or to both measuring intervals as common detection interval 10a. The lengths 30 of the measuring intervals and the length 31 of the detection interval 10a are shown clearly in FIG. 2. Three measuring pulses 13, the time intervals of which are selected randomly, are emitted in each measuring interval.

Figure 3A:
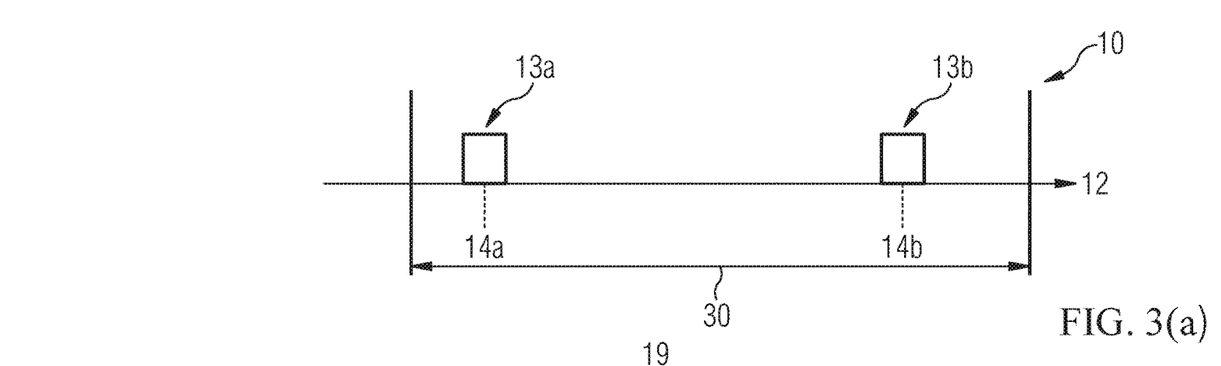
FIGS. 3(a)-3(b) show the creating of a histogram on the basis of a first measurement after receipt of two measuring pulses.
Figure 3B:
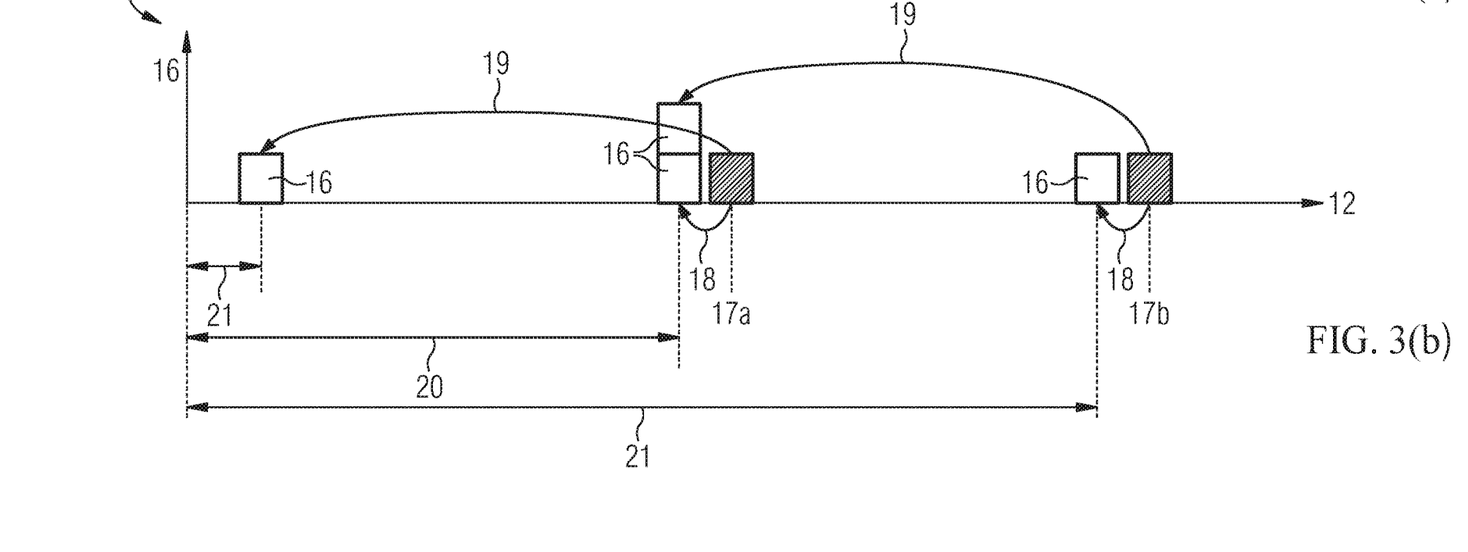

The creating of a histogram 15 of a first measurement of a first measuring interval 10 after receipt of two measuring pulses 13, of a first measuring pulse 13a and of a second measuring pulse 13b, is illustrated in a simplified manner in FIGS. 3(a)-3(b). It is illustrated in a simplified manner because the two measuring pulses 13 originate from the same measuring interval and because it is assumed that no measuring pulses were emitted in the previous measuring interval. In other words, this is a first measuring interval 10 with regard to time.

The emitting times of the two measuring pulses 13 can be seen clearly in FIG. 3(a), namely a first emitting time 14a of the first measuring pulse 13a and a second transmission time 14b of the second measuring pulse 13b.

The histogram 15, which plots entries 16 over the time 12, from the start of the first measuring interval 10, is shown in FIG. 3(b). The positions in the histogram, which would be entered without any consideration of the emitting times, are illustrated by means of shading. In other words, these are the "uncorrected" measured receiving times of the two received measuring pulses, namely the first receiving time 17a for the first measuring pulse 13a, and the second receiving time 17b for the second measuring pulse 13b.

The short arrows on the bottom side of the histogram 15 show a shift of these "uncorrected positions by the first emitting time 14a of the first measuring pulse 13a. The above-illustrated longer arrows show the respective shift 19 by the second emitting time of the second measuring pulse 13b. The shifts ensure a compensation with regard to the different emitting times. In other words, all possible emitting times are considered in that they are deducted from the receiving times. The shaded entries are not entered, while the other times-of-flight determined by the compensations are entered. As a whole, four times-of-flight are thus determined, which form the first amount of times-of-flight, and which are entered at the respective positions. It can be seen clearly how two entries, namely in each case one based on the receipt of the first measuring pulse 13a, and one based on the receipt of the second measuring pulse 13b, overlap at one position. This marks the correct time-of-flight 20, while the incorrect times-of-flight 21 are distributed symmetrically around the correct time-of-flight 20 in the histogram 15.

Figure 4A:
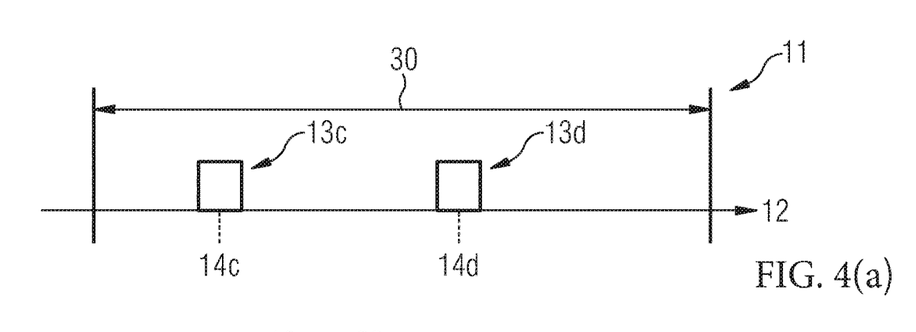
FIG. 4(a)-4(b) show the creating of a histogram on the basis of a second measurement after receipt of two measuring pulses.
Figure 4B:
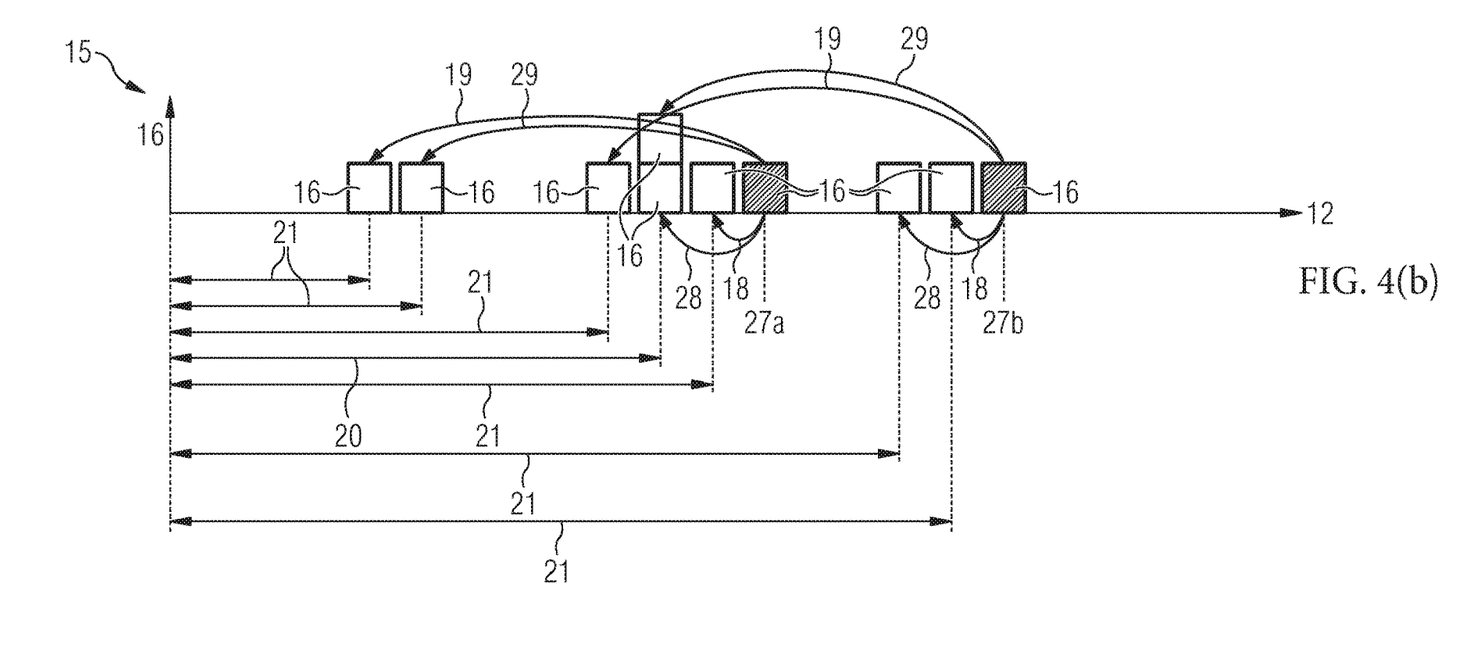

A second measurement of a second measuring interval 11 is shown in FIGS. 4(a)-4(b). The first emitting time 14c of a first measuring pulse 13c of the second measuring interval 11, and a second emitting time 14d of a second measuring pulse 13d of the second measuring interval 11 can be seen in FIG. 4(a).

It is shown in FIG. 4(b), how the receiving times, which are illustrated by means of shading, namely the first receiving time 27a for the first measuring pulse 13c, and the second receiving time 27b for the second measuring pulse 13d, are compensated in the histogram. Compensation takes place by means of corresponding shifts, namely initially by means of a corresponding shift 18 by the first emitting time 14a of the first measuring interval 10, a shift 19 by the second emitting time 14b of the first measuring interval 10, a shift 28 by the first emitting time 14c of the second measuring interval 11, and a shift 29 by the second emitting time 14d of the second measuring interval 11. Compensation takes place in each case by deduction of the corresponding emitting times from the respective receiving time.

It can be seen clearly again, how an entry based on both measuring pulses in each case overlaps at the correct position of the time-of-flight, while all other entries are distributed symmetrically around them. Due to the compensation with regard to the emitting times of the measuring pulses of the same measuring interval, a first amount is formed, wherein a second amount of times-of-flight is formed compared to the emitting times of the previous measuring interval.

Figures 5A, 5B, 5C:
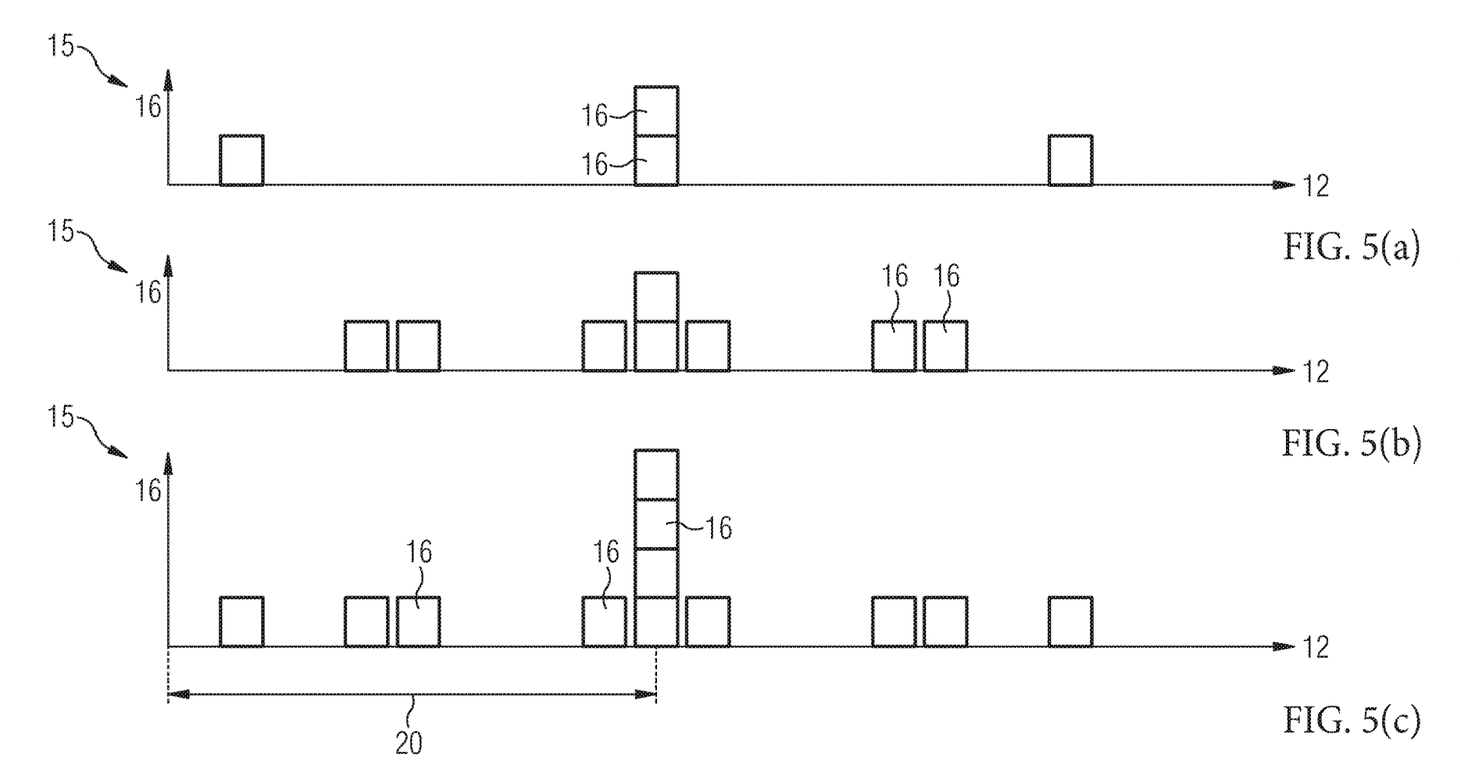
FIG. 5(a)-5(c) show the histograms of FIGS. 3(a)-3(b) and FIGS. 4(a)-4(b) as well as a common histogram.

The histograms 15 of the different measurements of FIGS. 3(b) and 4(b) are shown in FIGS. 5(a)-5(c), whereby FIG. 5(a) shows the histogram 15 of the first measurement of the first measuring interval 10 of FIG. 3(a), and FIG. 5(b) shows the histogram 15 of the second measurement of the second measuring interval 11 of FIG. 4(a).

An overlapped histogram 15 of the two measurements is shown in FIG. 5(c), which makes it clear how an entry of all received measuring pulses can in each case be overlapped at the correct position, and the correct time-of-flight 20 and thus distance can be read from the histogram in a simple manner by determining the maximum.

What is claimed is:

1. A method for optically measuring distances in a measuring region, the method comprising:
   emitting a first plurality of measuring pulses at first emitting times during a first measuring interval using a transmitting element of a transmitting unit;
   emitting a second plurality of measuring pulses at second emitting times during a second measuring interval using the transmitting element of the transmitting unit;
   receiving reflected measuring pulses at receiving times using a receiving element of a receiving unit;
   determining a first amount of times-of-flight for each received measuring pulse, wherein each time of flight in the first amount of times-of-flight is determined based on an emitting time in the first emitting times;
   determining a second amount of times-of-flight for each received measuring pulse, wherein each time-of-flight in the second amount of times-of-flight is determined based on an emitting time in the second emitting times;
   entering times-of-flight in the first amount of times-of-flight and times-of-flight in the second amount of times-of-flight into a common histogram for the receiving element; and
   determining a distance measurement using the common histogram.

2. The method according to claim 1,
   wherein the determining the first amount of times-of-flight for each received measuring pulse based on the emitting time in the first emitting times comprises deducting the emitting time in the first emitting times from a receiving time of the receiving times; and
   wherein the determining the second amount of times-of-flight for each received measuring pulse based on the emitting time in the second emitting times comprises deducting the emitting time in the second emitting times from the receiving time of the receiving times.

3. The method according to claim 1,
wherein the determining the distance measurement using the common histogram comprises determining a maximum in the common histogram.

4. The method according to claim 1,
wherein the measuring region includes at least one short section, a mid-section, and a far section; and
wherein the receiving reflected measuring pulses at the receiving times using the receiving element of the receiving unit comprises receiving the reflected measuring pulses from the short section, the mid-section, and the far section at different regions of the receiving element.

5. The method according to claim 4,
wherein the different regions of the receiving element comprise a short region, a mid-region and a far region;
wherein the first measuring interval comprises a short interval, a mid-interval, and a far interval;
wherein the short interval of the first measuring interval and the short region of the receiving element are assigned to the short section of the measuring region;
wherein the mid-interval of the first measuring interval and the mid-region of the receiving element are assigned to the mid-section of the measuring region; and
wherein the far interval of the first measuring interval and the far region of the receiving element are assigned to the far section of the measuring region.

6. The method according to claim 1,
wherein the first measuring interval and the second measuring interval follow one another directly in time.

7. The method according to claim 1,
wherein the first emitting times are relative to a start of the first measuring interval, and wherein the second emitting times are relative to a start of the second measuring interval, and wherein the receiving time is relative to the start of the first measuring interval, where the start of the second measuring interval is later than the start of the first measuring interval;
wherein determining the first amount of times-of-flight for each received measuring pulse based on the emitting time in the first emitting times comprises deducting the emitting time in the first emitting times from the receiving time;
wherein determining the second amount of times-of-flight for each received measuring pulse based on the emitting time in the second emitting times comprise deducting the emitting time in the second emitting times from the receiving time of the receiving times; and
wherein the entering times-of-flight in the first amount of times-of-flight and the times-of-flight in the second amount of times-of-flight into the common histogram for the receiving element comprises entering only times-of-flight greater than zero.

8. The method according to claim 1,
wherein the first plurality of measuring pulses comprises an equal number of measuring pulses to the second plurality of measuring pulses.

9. The method according to claim 1,
wherein at least some time adjacent measuring pulses in the first plurality of measuring pulses have a random emitting time difference and wherein at least some time adjacent measuring pulses in the second plurality of measuring pulses have a random emitting time difference.

10. The method according to claim 1,
wherein the first plurality of measuring pulses are encoded.

11. The method according to claim 1,
wherein at least two measuring pulses in either the first plurality of measuring pulses and the second plurality of measuring pulses differ in pulse shape.

12. A device for optically measuring distances in a measuring region, comprising:
a transmitting unit, the transmitting unit comprising at least one transmitting element adapted to emit measuring pulses into the measuring region;
a receiving unit, the receiving unit comprising at least one receiving element adapted to receive reflected measuring pulses;
and wherein the device is adapted to:
emit a first plurality of measuring pulses at first emitting times during a first measuring interval using a transmitting element of the transmitting unit;
emit a second plurality of measuring pulses at second emitting times during a second measuring interval using the transmitting element of the transmitting unit;
receive reflected measuring pulses at receiving times using a receiving element of a receiving unit;
determine a first amount of times-of-flight for each received measuring pulse, wherein each time of flight in the first amount of times-of-flight is determined based on an emitting time in the first emitting times;
determine a second amount of times-of-flight for each received measuring pulse, wherein each time-of-flight in the second amount of times-of-flight is determined based on an emitting time in the second emitting times;
enter times-of-flight in the first amount of times-of-flight and times-of-flight in the second amount of times-of-flight into a common histogram for the receiving element; and
determine a distance measurement using the common histogram.

13. The device according to claim 12,
wherein the device is adapted to determine the first amount of times-of-flight for each received measuring pulse based on the emitting time in the first emitting times by deducting the emitting time in the first emitting times from a receiving time of the receiving times; and
wherein the device is adapted to determine the second amount of times-of-flight for each received measuring pulse based on the emitting time in the second emitting times by deducting the emitting time in the second emitting times from the receiving time of the receiving times.

14. The device according to claim 12,
wherein the device is adapted to determine the distance measurement using the common histogram comprises determining a maximum in the common histogram.

15. The device according to claim 12,
wherein the measuring region includes at least one short section, a mid-section, and a far section; and
wherein the device is adapted to receive reflected measuring pulses at the receiving times using the receiving element of the receiving unit by receiving the reflected measuring pulses from the short section, the mid-section, and the far section at different regions of the receiving element.

16. The device according to claim 15, wherein the different regions of the receiving element comprise a short region, a mid-region and a far region;

wherein the first measuring interval comprises a short interval, a mid-interval, and a far interval;

wherein the short interval of the first measuring interval and the short region of the receiving element are assigned to the short section of the measuring region;

wherein the mid-interval of the first measuring interval and the mid-region of the receiving element are assigned to the mid-section of the measuring region; and wherein the far interval of the first measuring interval and the far region of the receiving element are assigned to the far section of the measuring region.

17. The device according to claim 12, wherein the first emitting times are relative to a start of the first measuring interval, and wherein the second emitting times are relative to a start of the second measuring interval, and wherein the receiving time is relative to the start of the first measuring interval, where the start of the second measuring interval is later than the start of the first measuring interval;

wherein the device is adapted to determine the first amount of times-of-flight for each received measuring pulse based on the emitting time in the first emitting times by deducting the emitting time in the first emitting times from the receiving time;

wherein the device is adapted to determine the second amount of times-of-flight for each received measuring pulse based on the emitting time in the second emitting times by deducting the emitting time in the second emitting times from the receiving time of the receiving times; and wherein the device is adapted to enter times-of-flight in the first amount of times-of-flight and the times-of-flight in the second amount of times-of-flight into the common histogram for the receiving element by entering only times-of-flight greater than zero.

18. The device according to claim 12, wherein at least some time adjacent measuring pulses in the first plurality of measuring pulses have a random emitting time difference and wherein at least some time adjacent measuring pulses in the second plurality of measuring pulses have a random emitting time difference.

19. The device according to claim 12, wherein the first plurality of measuring pulses are encoded.

20. A computer program product, which comprises a computer-readable storage device, on which a program is stored, which, after it was loaded into a memory of a computer, makes it possible for the computer to carry out a method for optically measuring distances in a measuring region, the method comprising:

emitting a first plurality of measuring pulses at first emitting times during a first measuring interval using a transmitting element of a transmitting unit;

emitting a second plurality of measuring pulses at second emitting times during a second measuring interval using the transmitting element of the transmitting unit;

receiving reflected measuring pulses at receiving times using a receiving element of a receiving unit;

determining a first amount of times-of-flight for each received measuring pulse, wherein each time of flight in the first amount of times-of-flight is determined based on an emitting time in the first emitting times;

determining a second amount of times-of-flight for each received measuring pulse, wherein each time-of-flight in the second amount of times-of-flight is determined based on an emitting time in the second emitting times;

entering times-of-flight in the first amount of times-of-flight and times-of-flight in the second amount of times-of-flight into a common histogram for the receiving element; and determining a distance measurement using the common histogram.

\* \* \* \* \*